United States Patent
Torres

(10) Patent No.: US 9,979,287 B2
(45) Date of Patent: May 22, 2018

(54) FEEDFORWARD LOOP TO STABILIZE CURRENT-MODE SWITCHING CONVERTERS

(71) Applicant: TEXAS INSTRUMENTS INCORPORATED, Dallas, TX (US)

(72) Inventor: Erick Omar Torres, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 145 days.

(21) Appl. No.: 14/482,835

(22) Filed: Sep. 10, 2014

(65) Prior Publication Data

US 2016/0072385 A1 Mar. 10, 2016

(51) Int. Cl.
*H02M 3/156* (2006.01)
*H02M 1/00* (2006.01)

(52) U.S. Cl.
CPC .... *H02M 3/156* (2013.01); *H02M 2001/0019* (2013.01)

(58) Field of Classification Search
CPC .......... H02M 1/15; H02M 3/158; H02M 1/08; H02M 3/156; H02M 2001/0016; H02M 2001/0019
See application file for complete search history.

(56) References Cited

U.S. PATENT DOCUMENTS

| | | | | |
|---|---|---|---|---|
| 5,638,789 A * | 6/1997 | Hayner | ................ | F02D 41/14 123/357 |
| 6,049,473 A * | 4/2000 | Jang | ................ | H02M 1/4216 363/44 |
| 6,583,609 B1 * | 6/2003 | Pardoen | ................ | H02M 3/156 323/283 |
| 8,077,490 B1 * | 12/2011 | Prodic | ................ | H02M 3/157 323/282 |
| 2005/0248393 A1 * | 11/2005 | North | ................ | G11B 20/24 327/551 |
| 2006/0125455 A1 * | 6/2006 | Tiew | ................ | H02M 3/156 323/282 |
| 2007/0210770 A1 * | 9/2007 | Dean | ................ | G05F 1/46 323/273 |
| 2009/0218996 A1 * | 9/2009 | Kaplish | ............. | G01R 19/0092 323/272 |
| 2012/0013322 A1 * | 1/2012 | Dearborn | ............. | H02M 3/156 323/283 |
| 2013/0057241 A1 * | 3/2013 | Shuvalov | ............. | H03K 17/122 323/271 |
| 2014/0125306 A1 * | 5/2014 | Babazadeh | ............ | G05F 5/00 323/285 |
| 2014/0159686 A1 * | 6/2014 | Lee | ................ | H02M 3/156 323/282 |
| 2014/0253064 A1 * | 9/2014 | Swanson | ............. | H02M 3/1584 323/272 |

* cited by examiner

*Primary Examiner* — Yemane Mehari
*Assistant Examiner* — Bart Iliya
(74) *Attorney, Agent, or Firm* — Dawn Jos; Charles A. Brill; Frank D. Cimino

(57) ABSTRACT

A circuit includes a current sensor to sense a switching current flowing at input side of a switching DC-DC converter. An output capacitor filters an output voltage at an output side of the switching DC-DC converter. A feedforward circuit passes a portion of the sensed switching current to a feedback path on the output side of the switching DC-DC converter simulating a changing effective series resistance (ESR) of the output capacitor to facilitate operating stability in the switching DC-DC converter.

18 Claims, 4 Drawing Sheets

FEEDFORWARD LOOP TO STABILIZE CURRENT-MODE SWITCHING CONVERTERS

TECHNICAL FIELD

This disclosure relates to switching power supplies, and more particularly to a circuit that adjusts the effects of an equivalent series resistance (ESR) of an output filter for a switching converter to facilitate stabilization of the converter.

BACKGROUND

A switching regulator (or converter) is a circuit that uses a power switch, an inductor, and a diode to transfer energy from input to output. At the output, a storage capacitor receives the energy generated in the inductor via switching of the power switch. The basic components of the switching converter can be rearranged to form a step-down (buck) converter, a step-up (boost) converter, or an inverter (flyback), for example. Feedback and control circuitry can be nested around these circuits to regulate the energy transfer from the inductor to the storage capacitor to maintain a constant output within normal operating conditions.

The most common control method for controlling the switching converter is via pulse-width modulation (PWM). This method takes a sample of the output voltage and subtracts this from a reference voltage to establish a small error signal (VERROR). This error signal is compared to an oscillator ramp signal. A comparator outputs a digital output (PWM) signal that operates the power switch. When the circuit output voltage changes, VERROR also changes and thus causes the comparator threshold to change. Consequently, the output pulse width (PWM) also changes. This duty cycle change then moves the output voltage to reduce the error signal to zero, thus completing the control loop.

One issue with PWM converters is related to operating stability of the control loops that maintain the output voltage in regulation. The control loop for the converter has a gain factor that varies over the operating frequency of the converter. The gain factor is influenced by Poles and Zero's that are derived from the transfer function of the circuit and are influenced by the different components of the converter. For example, the output storage capacitor in the converter has a parameter referred to as equivalent series resistance (ESR) which is derived from the frequency in which the storage capacitor receives energy from the input side of the converter. The ESR of the storage capacitor contributes a Zero in the control transfer function which contributes to the overall stability of the control loop (e.g., cancels a dominant Pole in the loop). Over time and temperature, however, the ESR of the storage capacitor can change which changes the placement of the Zero in the frequency domain for the control transfer function and thus can destabilize the control loop.

SUMMARY

This disclosure relates to a circuit that adjusts the effects of an equivalent series resistance (ESR) of an output filter for a switching converter to facilitate stabilization of the converter. In one example, a circuit includes a current sensor to sense a switching current flowing at input side of a switching DC-DC converter. An output capacitor filters an output voltage at an output side of the switching DC-DC converter. The feed-forward circuit passes a portion of the sensed switching current to a feedback path on the output side of the switching DC-DC converter simulating a changing effective series resistance (ESR) of the output capacitor to facilitate operating stability in the switching DC-DC converter.

In another example, a circuit includes a current sensor to sense a switching current flowing at input side of a switching DC-DC converter. An output capacitor filters an output voltage at an output side of the switching DC-DC converter. The feed-forward circuit passes a portion of the sensed switching current to a feedback path on the output side of the switching DC-DC converter. The feed-forward circuit changes a frequency response of a control transfer function affected by the effective series resistance (ESR) of the output capacitor to stabilize the DC-DC converter. A high pass filter in the feed-forward circuit filters DC currents of the sensed current and passes AC ripple currents of the sensed current to the feedback path to change the frequency response of the control transfer function.

In yet another example, an integrated circuit includes a switching circuit to switch a current in an inductor at the input side of the switching DC-DC converter. A current sensor senses the current flowing in the inductor. A ratio circuit selects a ratio of the current sensed by the current sensor. An output capacitor filters an output voltage at an output side of the switching DC-DC converter. A feed-forward circuit passes the portion of the selected current from the ratio circuit to a feedback path on the output side of the switching DC-DC converter. The feed-forward circuit alters a location of a control transfer function ZERO defined by the effective series resistance (ESR) of the output capacitor. A high pass filter in the feed-forward circuit filters DC currents of the sensed current and passes AC ripple currents of the sensed current to the feedback path to alter the location of the control transfer function ZERO defined by the ESR to stabilize the switching DC-DC converter.

DETAILED DESCRIPTION

This disclosure relates to a circuit that adjusts the effects of an equivalent series resistance (ESR) of an output filter for a switching converter to facilitate stabilization of the converter. In one example, a switching converter can include various types of current-mode DC-DC converters that can include step-up converters, step-down converters, inverters, and isolation type converters that provide substantially the same output voltage as supplied by the input voltage. The switching converter includes a switching circuit to switch a current in an inductor at the input side of the switching DC-DC converter. A current sensor senses the current flowing in the inductor. In one example, a ratio circuit (e.g., N:1 step-down) selects a portion of the current flowing in the inductor. As the current is switched in the inductor, rectifiers (e.g., half-wave, full-wave, synchronous rectifiers) on the output side of the converter convert the switched inductor current into a DC output voltage on the output side of the converter. An output capacitor filters the output voltage at the output side of the converter.

Depending on the type, temperature and time that the output capacitor is installed, for example, the effective series resistance (ESR) of the output capacitor can change which can destabilize the converter (e.g., move a cancelling POLE in the converter transfer function). Thus, a feed-forward circuit is provided that has the effect of mitigating the effects of the changing ESR which allows the converter to operate in a stable manner. The feed-forward circuit passes the portion of the selected current from the ratio circuit to a feedback path on the output side of the switching converter. The feedback path enables regulation of an output voltage for the switching converter. The feed-forward circuit simulates an increased ESR of the output capacitor to facilitate operating stability in the converter. A high pass filter in the feed-forward circuit filters DC currents of the sensed current and passes AC ripple currents of the sensed current to the feedback path to simulate the increased ESR.

Figure 1:
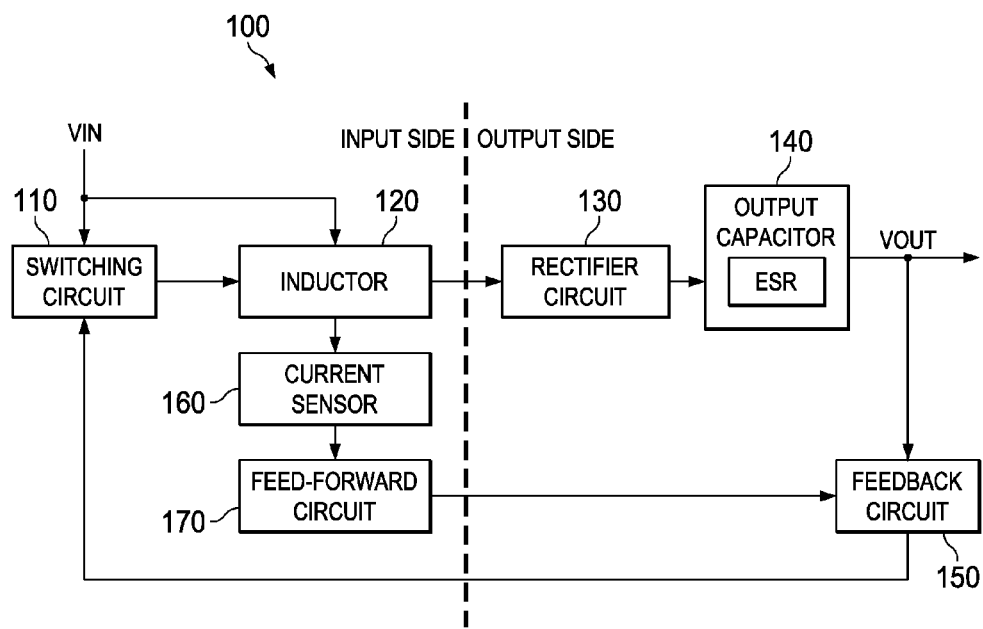
FIG. 1 illustrates an example of a circuit that adjusts the effects of an equivalent series resistance (ESR) of an output filter for a switching converter to facilitate stabilization of the converter.

FIG. 1 illustrates an example of a circuit 100 that adjusts the effects of an equivalent series resistance (ESR) of an output filter for a switching converter to facilitate stabilization of the converter. As used herein, the term circuit can include a collection of active and/or passive elements that perform a circuit function such as a switching circuit or rectifier circuit, for example. The term circuit can also include an integrated circuit where all the circuit elements are fabricated on a common substrate, for example. The circuit 100 can be configured as a switching DC-DC converter (also referred to as switching converter). At an input side of the circuit 100, a voltage VIN drives a switching circuit 110 (e.g., pulse width modulated (PWM) circuit) that switches VIN to an inductor 120. Stored energy in the inductor 120 is transferred to an output side of the circuit 100 to be rectified by a rectifier circuit 130. Output from the rectifier circuit 130 is filtered by a bulk storage output capacitor 140 to filter a regulated output voltage VOUT. The output voltage VOUT is sampled via a feedback circuit 150 and fed back to the switching circuit 110 to control the duty cycle of the switching circuit to maintain VOUT at a desired regulation voltage. The switching circuit 110 can include a comparator (not shown) and a reference voltage to set the regulation of VOUT.

A current sensor 160 senses the current flowing in the inductor 120. In one example, a ratio circuit (See e.g., FIG. 4) in the sensor circuit (e.g., N:1 step-down, N:1 step-down followed by M:1 step down) selects a portion of the current flowing in the inductor 120. Depending on the type, temperature, and time that the output capacitor 140 is installed, for example, the effective series resistance (ESR) of the output capacitor can change which can destabilize the circuit 100. In addition to ESR variations due to temperature and time, ESR variations can also be attributed to the type of capacitor used. For instance, a ceramic capacitor typically exhibits low ESR values (e.g., in the 10-mOhm range), while aluminum capacitors have higher ESR values (e.g., in the 1-Ohm range). A feed-forward circuit 170 is provided that has the effect of mitigating the effects of the changing ESR in the output capacitor 140 which allows the circuit 100 to operate in a stable manner. The feed-forward circuit 170 passes the portion of the selected current from the current sensor 160 to the feedback circuit 150 on the output side of the circuit 100.

The feed-forward circuit 170 simulates an increased ESR of the output capacitor 140 to facilitate operating stability in the converter. Essentially, high frequency AC ripple currents generated by the inductor 120 and sensed by the current sensor 160, are passed to the feedback circuit 150 which has the effect of simulating an increased ESR in the output capacitor 140. A high pass filter (not shown) in the feed-forward circuit 170 filters DC currents of the sensed current and passes AC ripple currents of the sensed current to the feedback circuit 150 to simulate the increased ESR. The inductor ripple current that is fed-forward to the feedback circuit 150 via the feed-forward circuit 170 has the effect of appearing to increase the ripple current at VOUT yet without affecting the regulated value of the DC voltage VOUT. The ripple current generally only appears in the feedback circuit 150 however and has the effect of feeding back a higher frequency to the switching circuit 110 which moves an operating ZERO of the circuit 100 in response to changing ESR.

In one specific example, the output capacitor 140 can be a 330 µF capacitor (or capacitance if multiple capacitors employed for the output capacitor) with ESR varying from 0.05 to 1.6Ω, for example. The ESR ZERO therefore can move substantially, by orders of magnitude, and thus, affecting stabilization of the circuit 100. For instance, at higher ESR values, the ZERO provided by the ESR helps in cancelling non-dominant poles, but at lower values it moves away to higher frequencies and the effect of those poles becomes more pronounced—thus leading to loop transfer function instability. The circuits described herein amplify the effect of the ESR with a feed-forward current loop to facilitate that the ESR ZERO does not vary over such a wide range. Thus, feed-forward inductor current information is directly applied to the feedback circuit 150 to simulate an increased ESR and move the ZERO to promote stability in the control loop. In this manner, the effect of the capacitor ESR is augmented by mimicking its ripple voltage with feed-forward inductor current. As a result, the ESR ZERO can be set at a desired frequency. To mitigate DC errors, the feed-forward circuit 170 can employ a high-pass filter to decrease its gain near DC levels.

Figure 2:
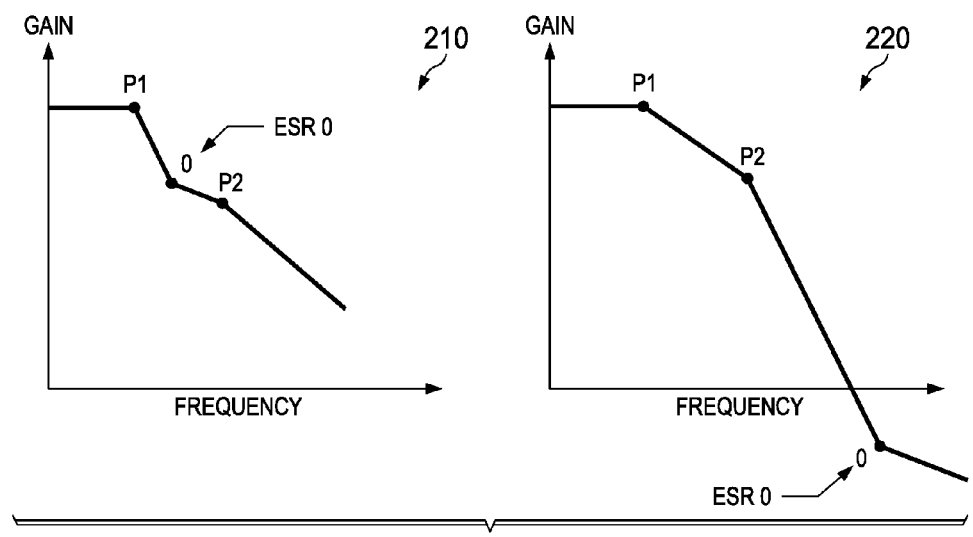
FIG. 2 illustrates an example diagram depicting movement of poles based on the effects equivalent series resistance (ESR) of an output filter for a switching converter.

FIG. 2 illustrates an example diagram depicting movement of poles based on the effects equivalent series resistance (ESR) of an output filter for a switching converter. A bode plot 210 depicts a loop transfer function with loop gain on the vertical access versus frequency on the horizontal access. A POLE P1 causes a frequency roll-off of the gain. A ZERO (0) appears and has the effect of cancelling a POLE P2 which alters the slope of the roll-off. The ZERO in this example is supplied by an output capacitor having a higher ESR which contributes to loop stability by cancelling POLE P2. A second bode plot 220 illustrates a gain transfer function where the ESR ZERO has moved to a higher frequency than that depicted at 210. In this example, both POLES P1 and P2 cause an increased slope for the roll-off which can contribute to decreased loop stability. The ZERO which has moved in the example of 200 to the higher frequency is the result of ESR of the output capacitor decreasing. Thus, the circuits described herein have the effect of moving the ZERO depicted at 220 to a lower-frequency region depicted at 210 by simulating the effects of increased ESR.

Figure 3:
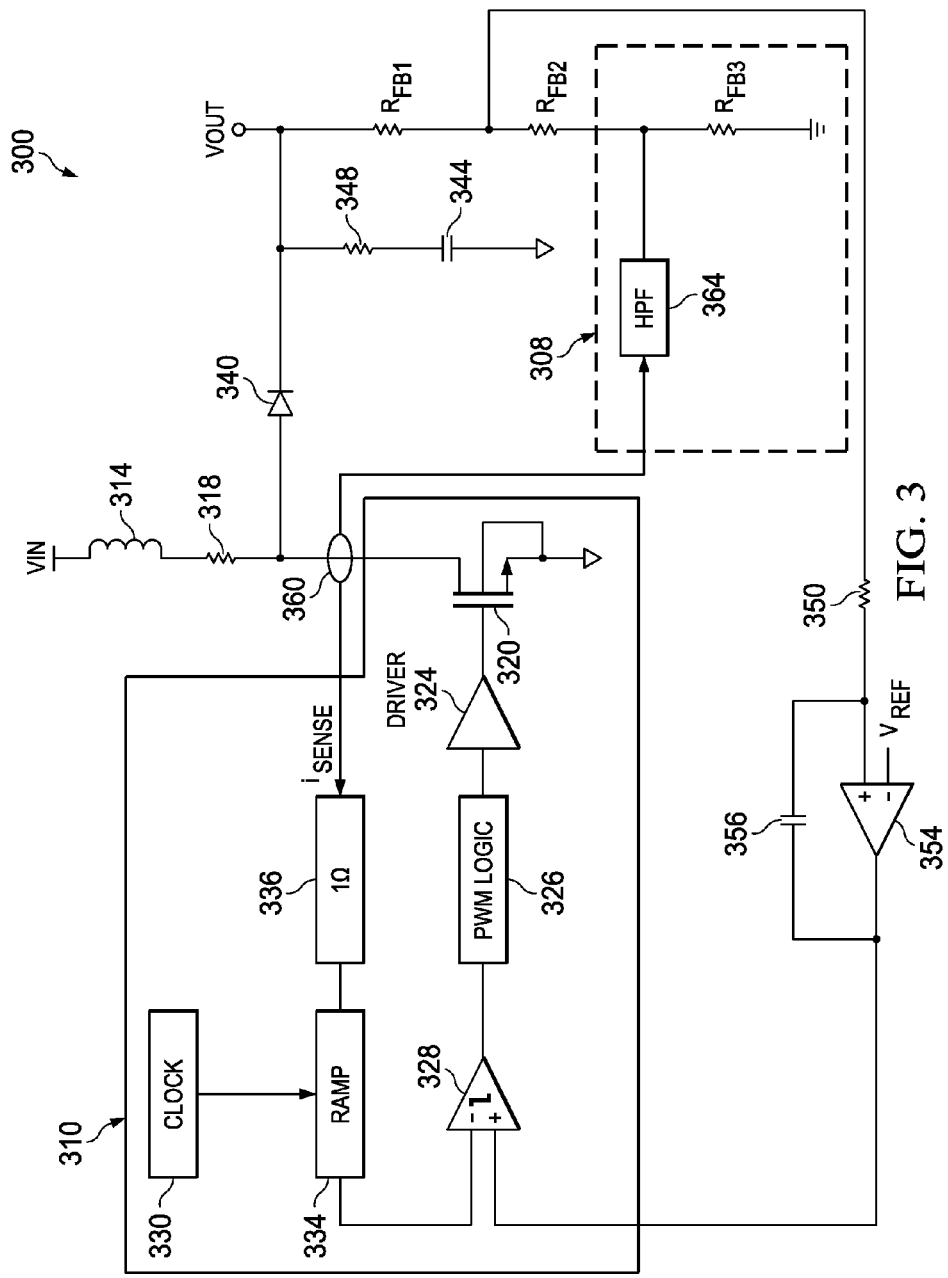
FIG. 3 illustrates an example circuit that employs a high pass filter in a feed-forward path to adjust the effects of an equivalent series resistance (ESR) of an output filter for a switching converter to facilitate stabilization of the converter.

FIG. 3 illustrates an example circuit 300 that employs a high pass filter in a feed-forward path 308 to adjust the effects of an equivalent series resistance (ESR) of an output filter for a switching converter to facilitate stabilization of the converter. The circuit 300 includes a switching circuit 310 to drive an inductor 314 via resistor 318. The switching circuit 310 includes a transistor device 320 to switch current in the inductor 314 and is driven by a driver 324. The driver 324 is driven by PWM logic 326 which is in turn driven by comparator 328. A clock 330 drives a ramp generator 334 which supplies a ramp signal to one input of the comparator 328 to control voltage regulation of the circuit 300. A resistor 336 can optionally feed inductor current to control operations of the ramp generator 334.

Figure 4:
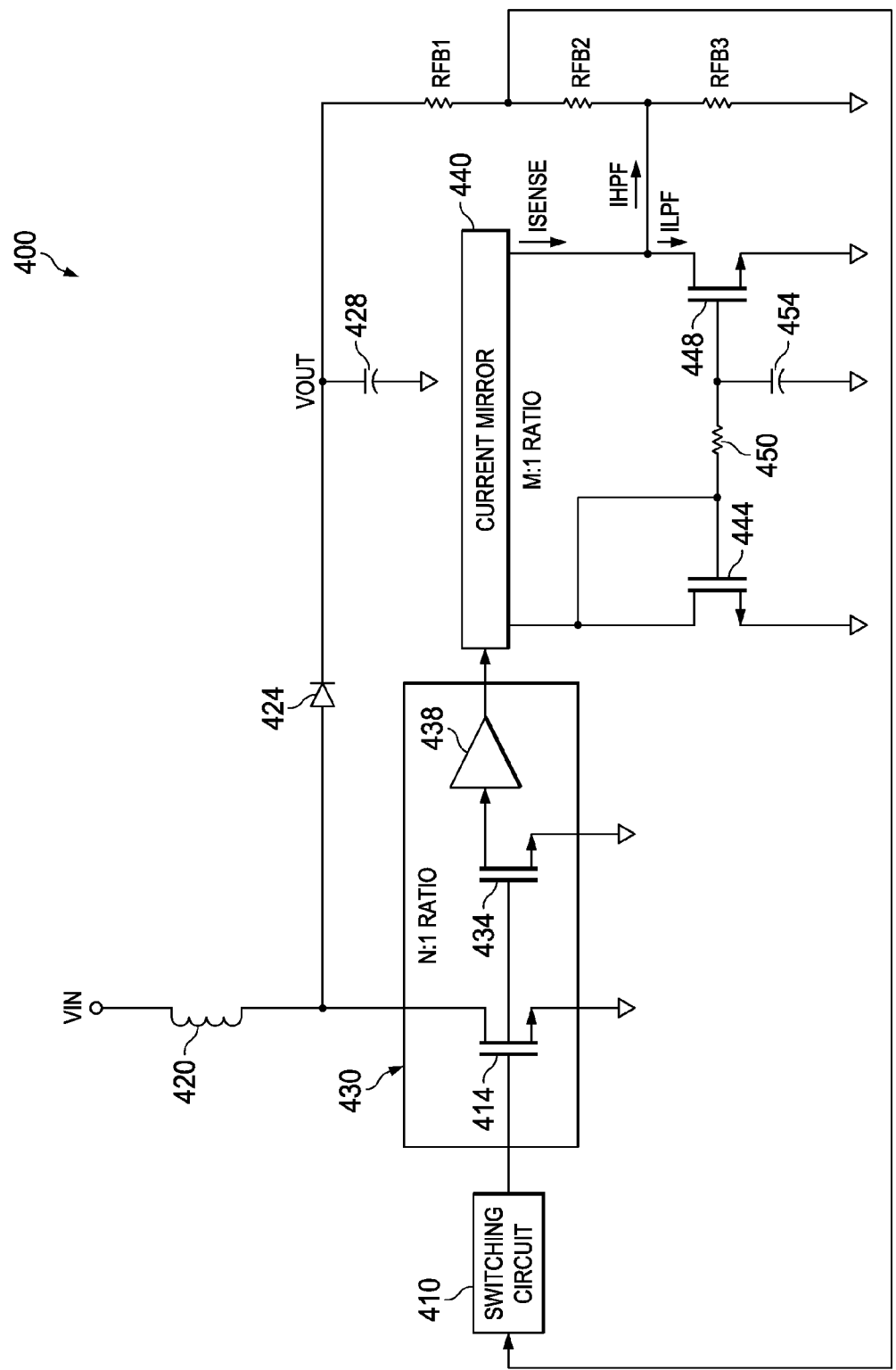
FIG. 4 illustrates an example circuit that employs a high pass filter and a ratio circuit in a feed-forward path to adjust the effects of an equivalent series resistance (ESR) of an output filter for a switching converter to facilitate stabilization of the converter.

Output from the switching circuit 310 is fed though a rectifier 340 to generate VOUT. The voltage VOUT is filtered by an output capacitor 344 which has an equivalent series resistance (ESR) depicted by resistor 348. The voltage VOUT is fed back via feedback resistors RFB1 and RFB2 through resistor 350 to an integrator 354 having a feedback capacitor 356. The integrator 354 utilizes a reference VREF to control VOUT to a desired DC voltage by providing feedback to the comparator 328. As shown, a current sense 360 samples inductor current and feeds the current to the feed-forward path 308 through a high pass filter 364. The current sensor 360 can be an inductive loop sensor, for example, or can be provided via active electronic components such as depicted in FIG. 4 described below. Output from the high pass filter 364 is inserted into the voltage feedback loop via resistor RFB3. The current sensor 360 can provide a ratio of the inductor current that is fed-forward to the feedback loop via RFB3. By controlling the ratio (amount of current fed back) and/or the scaling of RFB3, the frequency of the control loop can be adjusted by moving the ZERO associated with the ESR 348 of output capacitor 344. Such adjustments are described in more detail below with respect to FIG. 4.

FIG. 4 illustrates an example circuit 400 that employs a high pass filter and a ratio circuit in a feed-forward path to adjust the effects of an equivalent series resistance (ESR) of an output filter for a switching converter to facilitate stabilization of the converter. The circuit 400 includes a switching circuit 410 that drives a transistor device 414 which in turn drives inductor 420. Output from the inductor 420 is rectified via rectifier 424 which supplies VOUT that is filtered by output capacitor 428. Output from VOUT is fed back via resistors RFB1 and RFB2 to the switching circuit 410 to control DC regulation of VOUT.

A current sensor circuit 430 samples a ratio of the amount of current in the inductor 420 and shown as an N:1 ratio, where N represents a smaller amount of the inductor current which is represented as 1. The current sensor 430 includes a scaling transistor 434 which provides a smaller amount of current than that switched by transistor 414 in the inductor 420. Transistor 434 drives an amplifier 438 (e.g., operational amplifier) which supplies the scaled current from transistor 434 to a current mirror (e.g., PMOS current mirror) 440. The current mirror 440 can provide an additional M:1 scaling of the scaled current from transistor 434, where M represents a smaller amount of output current from the current mirror 440 that from what is supplied at its input. The current mirror 440 generates two parallel scaled outputs that drive transistor pair 444 and 448. The transistor pair are coupled at their respective gate nodes via a low pass filter that includes resistor 450 and capacitor 454. The low pass filter has the effect of sinking DC currents from the current mirror 440 (shown as ILPF) while diverting high pass ripple currents (shown as IHPF) to the feedback loop via RFB3. Thus, a low pass filter in this configuration has the effect of creating a high pass filter to supply high pass ripple currents to the feedback loop which simulate an increased ESR in output capacitor 428 as previously described.

Movement of the ESR ZERO can be accomplished via several mechanisms in the circuit 400. In one example, scaling in the current sensor 430 and/or the current mirror 440 can cause more or less inductor current to be fed back which has the effect of moving the frequency at which the ESR ZERO appears in the loop transfer function. In another example, scaling of RFB3 can be utilized to move the ESR ZERO. For example, RFB1 and the combination of RFB2/RFB3 set the regulation of voltage VOUT. If a 2:1 ratio were employed for example, RFB1 could be set at twice the ratio of RFB2 and RFB3. If RFB1 were set to 2 k ohms for example, then the combination of RFB2 and RFB3 should equal 1 k ohms, for example. Thus, the ESR ZERO can be adjusted by controlling the ratio of RFB2 to RFB3 while maintaining their collective resistance at 1 k ohms. For example, if RFB2 were set at 900 ohms, RFB3 would be set at 100 ohms to maintain the 1 k ohm collective resistance. If more ESR adjustment were desired, RFB2 could be lowered while increasing RFB3 yet maintaining the collective resistance to the desired value (e.g., 1 k ohm in this specific example).

Figure 5:
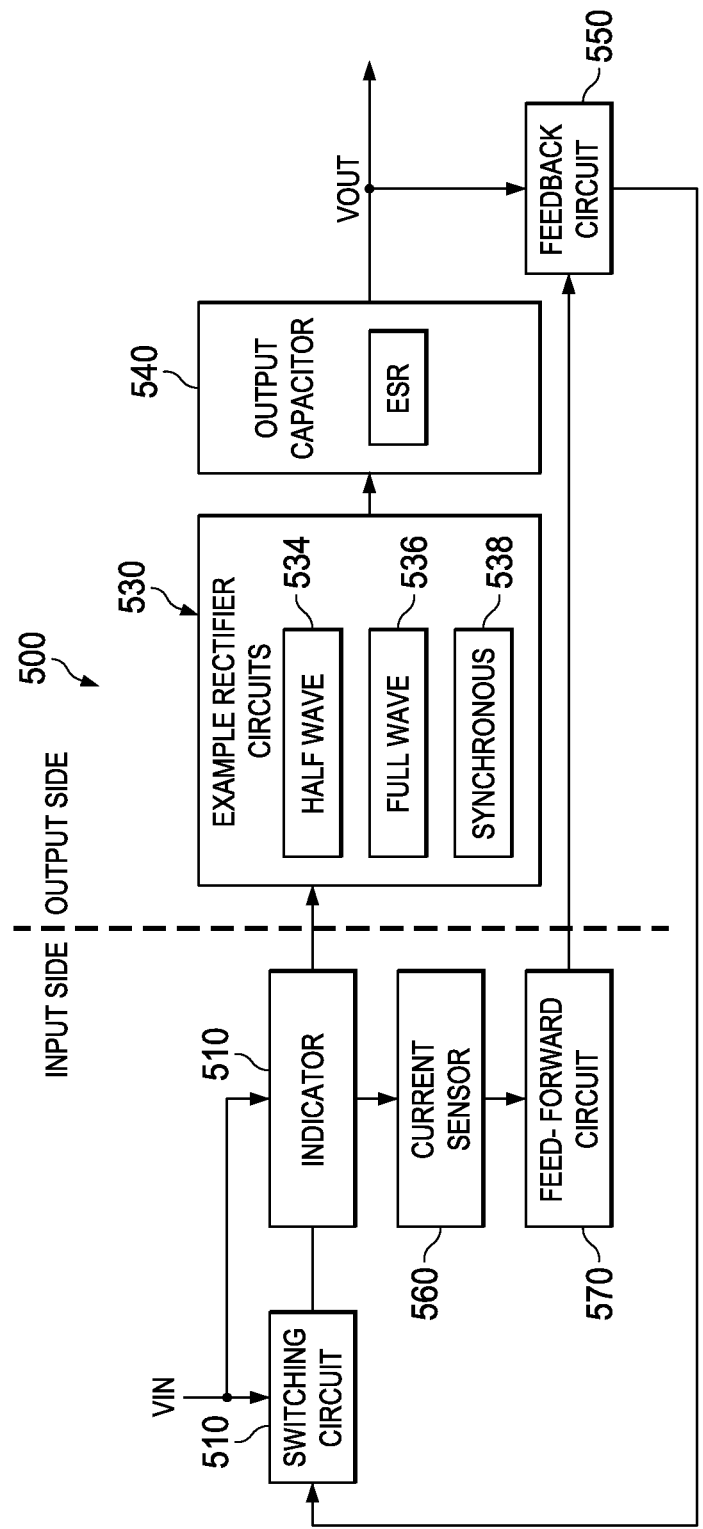
FIG. 5 illustrates an example of switching converter types that can be employed with a circuit that adjusts the effects of an equivalent series resistance (ESR) of an output filter for a switching converter to facilitate stabilization of the converter.

FIG. 5 illustrates an example of switching converter types that can be employed with a circuit 500 that adjusts the effects of an equivalent series resistance (ESR) of an output filter for a switching converter to facilitate stabilization of the converter. The circuit 500 can be configured as a switching DC-DC converter (also referred to as switching converter). At an input side of the circuit 500, a voltage VIN drives a switching circuit 510 (e.g., pulse width modulated (PWM) circuit) that switches VIN to an inductor 520. Stored energy in the inductor 520 is transferred to an output side of the circuit 500 to be rectified by example rectifier circuits 530, which are described below. Output from the rectifier circuit 530 is filtered by a bulk storage output capacitor 540 to filter a regulated output voltage VOUT. The output voltage VOUT is sampled via a feedback circuit 550 and fed back to the switching circuit 510 to control the duty cycle of the switching circuit to maintain VOUT at a desired regulation voltage. The switching circuit 510 can include a comparator (not shown) and a reference voltage to set the regulation of VOUT.

A current sensor 560 senses the current flowing in the inductor 520. A feed-forward circuit 570 is provided that has the effect of mitigating the effects of the changing ESR in the output capacitor 540 which allows the circuit 500 to operate in a stable manner. The feed-forward circuit 570 passes the portion of the selected current from the current sensor 560 to the feedback circuit 550 on the output side of the circuit 500. As previously described, the feed-forward circuit 570 simulates an increased ESR of the output capacitor 540 to facilitate operating stability in the converter. The example rectifier circuits 530 can include various forms of rectification. In one example, a half wave rectifier 534 (e.g., single diode) can be employed. In another example, the rectifier circuits 530 can include full wave rectification 536 (e.g., bridge rectifier). In yet another example, the rectifier circuits 530 can include synchronous rectification 538 (e.g., synchronous switches timed by a control circuit to control rectification via timing of input side switching and output side switching). Substantially any form of rectification can be employed by the circuit 530.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A circuit comprising:
   a current sensor to sense a switching current at an input side of a switching DC-DC converter;
   an output capacitor to filter an output voltage at an output side of the switching DC-DC converter;
   a feed-forward circuit that passes a portion of the sensed switching current to a feedback path on the output side of the switching DC-DC converter, the feed-forward circuit changes a frequency response of a control transfer function affected by the effective series resistance (ESR) of the output capacitor to stabilize the DC-DC converter;
   a current mirror to scale the sensed switching current at a ratio of M:1, wherein M represents a smaller amount of sensed output current than scaled by a scaling transistor; and
   a transistor pair that is driven by the current mirror, the transistor pair coupled via a low pass filter at their respective gate nodes, the transistor pair and low pass filter acting as a high pass filter to divert high pass ripple currents from the current mirror to the feedback path.

2. The circuit of claim 1, further comprising a ratio circuit to scale switching current sensed by the current sensor to a ratio of N:1, wherein N represents a smaller amount of sensed output current than the sensed switching current.

3. The circuit of claim 2, wherein the ratio circuit further comprises the scaling transistor.

4. The circuit of claim 1, the feedback path further comprises a first feedback resistor, a second feedback resistor, and a third feedback resistor to sample the output voltage, wherein the combination of the second and third feedback resistor form a voltage divider with the first feedback resistor to control the output voltage.

5. The circuit of claim 4, wherein the third feedback resistor is employed to change the simulated ESR by increasing or decreasing its value with the collective value formed by the combination of the second feedback resistor and the third feedback resistor.

6. A circuit comprising:
   a current sensor to sense a switching current at an input side of a switching DC-DC converter;
   an output capacitor to filter an output voltage at an output side of the switching DC-DC converter;
   a feed-forward circuit that passes a portion of the sensed switching current to a feedback path on the output side of the switching DC-DC converter simulating a changing effective series resistance (ESR) of the output capacitor to facilitate operating stability in the switching DC-DC converter;
   a ratio circuit to scale the sensed switching current to a ratio of N:1, wherein N represents a smaller amount of sensed output current than the sensed switching current;
   a current mirror to further scale the sensed switching current at a ratio of M:1, wherein M represents a smaller amount of sensed output current than scaled by a scaling transistor; and
   a transistor pair that is driven by the current mirror, the transistor pair coupled via a low pass filter at their respective gate nodes, the transistor pair and low pass filter acting as a high pass filter to divert high pass ripple currents from the current mirror to the feedback path.

7. The circuit of claim 6, wherein the high pass filter in the feed-forward circuit filters DC currents of the sensed switching current and passes AC ripple currents of the sensed switching current to the feedback path to simulate a changing effective series resistance (ESR).

8. The circuit of claim 6, wherein the ratio circuit further comprises a scaling transistor that scales the sensed switching current.

9. The circuit of claim 8, wherein the simulated ESR is changed by the scaling provided by the scaling transistor or the current mirror.

10. The circuit of claim 6, the feedback path further comprises a first feedback resistor, a second feedback resistor, and a third feedback resistor to sample the output voltage, wherein the combination of the second and third feedback resistor form a voltage divider with the first feedback resistor to control the output voltage.

11. The circuit of claim 10, wherein the third feedback resistor is employed to change the simulated ESR by changing its value with a collective value formed by a combination of the second feedback resistor and the third feedback resistor.

12. The circuit of claim 6, wherein the circuit is configured as a step-up converter, a step-down converter, an inverter, or an isolation converter.

13. The circuit of claim 6, further comprising a rectifier circuit that includes a half wave rectifier, a full wave rectifier, or a synchronous rectifier.

14. A circuit comprising:
   an inductor;
   an output capacitor coupled to the inductor;
   a voltage divider coupled to the output capacitor;
   a current sensor circuit coupled to the inductor; and
   a feed-forward circuit coupled to the current sensor circuit and to the voltage divider, the feed-forward circuit including:
      a current mirror; and
      a pair of transistors coupled to the current mirror, respective gate nodes of the pair of transistors coupled via a low pass filter, the pair of transistors and the low pass filter together forming a high pass filter.

15. The circuit of claim 14 further comprising a switching circuit coupled to the current sensor and the voltage divider.

16. The circuit of claim 14, wherein the pair of transistors and the low pass filter together pass ripple currents from the current mirror to the voltage divider.

17. The circuit of claim 14, wherein the current sensor circuit includes:

a first transistor coupled to the inductor and a scaling transistor coupled to the first transistor; and
an amplifier coupled to the scaling transistor.

18. The circuit of claim 14, wherein the low pass filter is configured to sink the DC current from the current mirror and passes AC ripple current from the current mirror to the voltage divider.

* * * * *